UNITED STATES PATENT OFFICE.

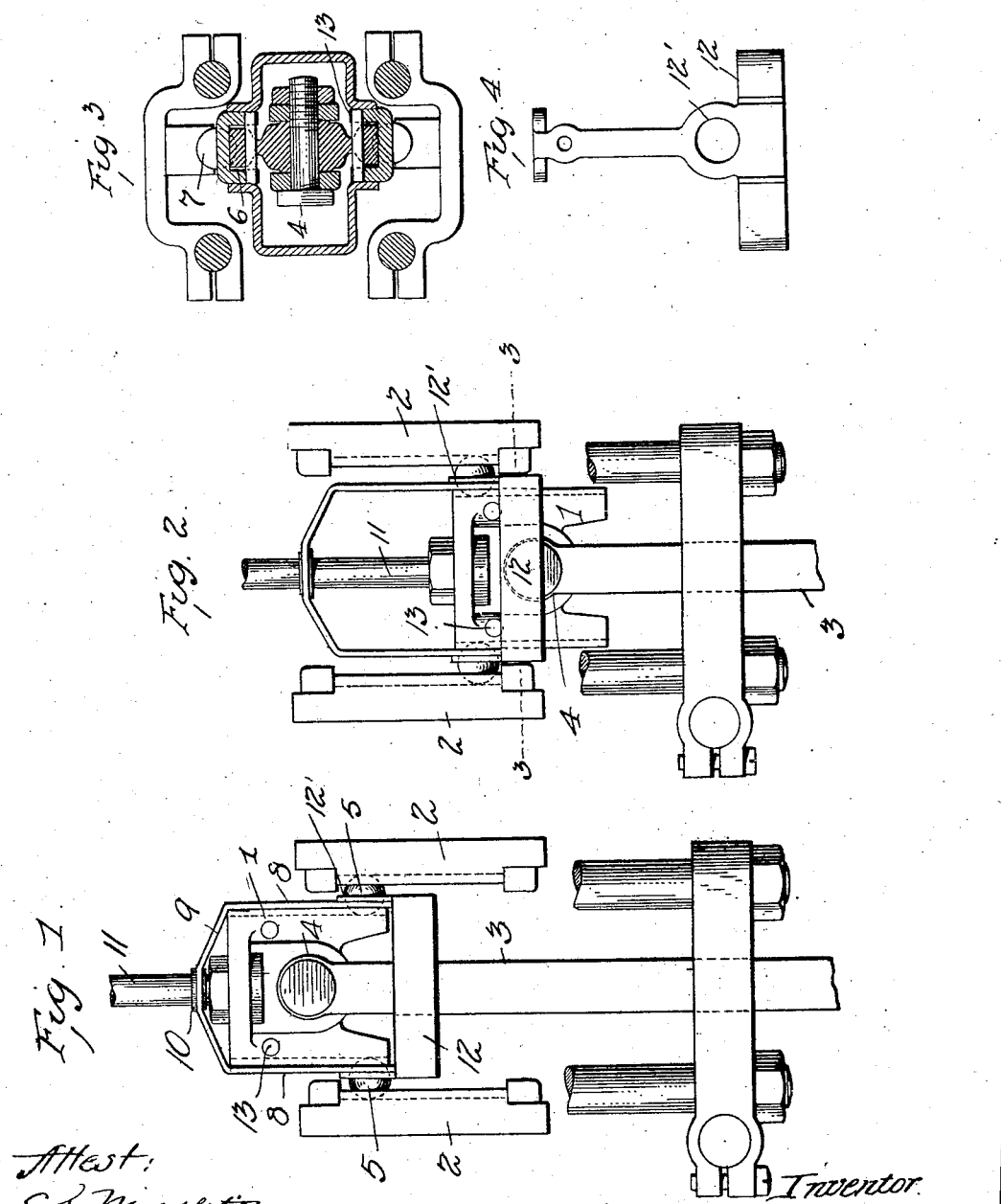

GEORGE LANE, OF POUGHKEEPSIE, NEW YORK, ASSIGNOR TO LANE MOTOR VEHICLE CO., A CORPORATION OF NEW JERSEY.

CROSS-HEAD.

No. 848,754.    Specification of Letters Patent.    Patented April 2, 1907.

Application filed January 2, 1907. Serial No. 350,482.

*To all whom it may concern:*

Be it known that I, GEORGE LANE, a citizen of the United States, residing at Poughkeepsie, New York, have invented certain new and useful Improvements in Cross-Heads for Engines, of which the following is a specification.

My invention relates to apparatus employing cross-heads moving between guides, and it concerns particularly an arrangement of antifriction means associated with said cross-head and its guides whereby the relation between the balls or rollers and the cross-head and guides is better maintained, resulting in a more perfect antifriction effect than has been possible heretofore.

Previous to my invention antifriction balls or rollers have been used or proposed for use between the cross-head and its guides having rolling contact with both to reduce friction, and while I in carrying out my invention employ balls or rollers between the cross-head and its guides I associate therewith retaining means whereby the antifriction devices are controlled as to their position longitudinally of the bearing-surfaces of the cross-head and guides, so that the antifriction member on one side of the cross-head is maintained in position relative to that on the other side of the cross-head and is ready at all times to perform its function, notwithstanding variations in pressure between the parts, due to the thrust of the crank.

The invention consists in the features, combination, and arrangement of parts hereinafter described, and particularly pointed out in the claims.

In the accompanying drawings, Figure 1 is a side view of a cross-head and its guides with my invention associated therewith, the cross-head being at the limit of its stroke in one direction. Fig. 2 is a similar view with the cross-head at the limit of its stroke in the opposite direction. Fig. 3 is a cross-section on the line 3 3 of Fig. 2. Fig. 4 is a side view of the antifriction retainer.

In the drawings, 1 indicates the cross-head of substantially ordinary form, working between guides 2, the latter being held by the frame in any suitable manner. The pitman is indicated at 3, pivotally connected to the cross-head at 4 in the customary manner. Between the cross-head and the guides antifriction members 5 are arranged, consisting in the present form, which I have used as illustrative of my invention, of balls. These are adapted to roll in the grooves or ways 6 7, formed, respectively, in the edges of the cross-head and in the guides, there being one ball for each side of the cross-head. These balls provide a rolling bearing for the cross-head on each side thereof, and theoretically they will traverse in one direction the ways or grooves in the guides while the cross-head is accomplishing its stroke in one direction and will traverse the guides in the opposite direction when the cross-head is on its return stroke. In practice, however, it is found that, owing mainly to the side thrust of the crank, the pressure on one side between the cross-head and the ball will be different from that between the cross-head and the ball on the other side, and consequently the ball, relieved of pressure, will lag in its rolling action and will get out of place, and this will result in a scraping or dragging of the ball against the ends of its ways or grooves or the stop thereat and against the bottoms of the grooves themselves when the ball is forced along by the movement of the cross-head. Particularly is this objection likely to occur when the cross-head is used on a vertical engine, for then the relieving of the pressure on one side of the cross-head, due to the side thrust of the crank, will result in the ball on that side falling down along its ways until arrested by the end wall or the stop, and in the continued movement of the cross-head the ball will be simply scraped along the way without performing its function as an antifriction device.

In carrying out my invention I provide a retainer having side portions 8 lying between the ways or grooves in the edges of the cross-head and those in the guides and having also the cross-piece 9 at one end extending across the end of the cross-head. This cross-piece is provided with an opening at 10 for the piston-rod 11. The lower ends of the sides are connected by the cross portions 12, which are so constructed and arranged as to at times embrace the cross-head. Openings or seats for the antifriction-balls are provided at 12′ in the sides of the retainer, and these are, as shown, arranged opposite each other in the present embodiment of the principle of my invention. The openings are of such size as to permit the balls to turn freely therein. This retainer is free to lag in respect to the movement of the cross-head to accord with the slower traversing movement of the antifriction rollers or balls, and, as will be seen, it retains the balls in their positions relative to each other and to the parts between which they lie. It will be clear that should the pressure on one of the balls decrease for any reason it will be carried along in unison with the other ball and the retainer, so that at the instant the normal relation of the parts is resumed this ball will then be in proper position to take up the work, and it will not be dragged, as has heretofore been the case, while under the pressure of the parts and with the ball against the stop at the end of the way or groove.

In order to locate the retainer accurately in relation to the cross-head at the beginning of each stroke, the cross-head at the end of its stroke in one direction acts against the cross-bar 9 to adjust the said retainer should it be slightly out of position, and pins or projections 13 on the cross-head strike against the cross portions 12 of the retainer on the other stroke of the cross-head and adjust it accurately to place for the beginning of the new stroke; but the employment of the retainer, acting as an alining device for the two oppositely-placed antifriction device by maintaining the balls in their relative position, will largely eliminate the displacement of the retainer and the balls in relation to the strokes of the cross-head.

As above stated, the cross-piece of the retainer is provided with an opening at 10 for the piston-rod, and therefore the retainer besides being guided by the piston-rod has a three-point bearing—namely, the two balls and the piston-rod.

I claim as my invention—

1. In combination with a reciprocating member, a guide therefor on each side thereof, antifriction devices between the reciprocating member and the guides and having movement of translation longitudinally of both the reciprocating member and the guides, and means for positively maintaining the oppositely-placed antifriction devices in their relative positions at all points of the stroke of the cross-head, substantially as described.

2. In combination with a reciprocating member, guides between which the reciprocating member moves, antifriction devices between said reciprocating member and the guides and located upon opposite sides of the said reciprocating member, and a retainer for the antifriction devices forming a connection between said oppositely-located antifriction devices and causing them to maintain their relative positions and move in unison, said retaining means having movement with the antifriction devices, longitudinally of the reciprocating member substantially as described.

3. In combination, a reciprocating member, guides between which said member moves, antifriction devices between the said member and the guides, a retainer engaging the antifriction devices and forming a connection between them causing them to move in unison, the said retainer being adjusted at the ends of the stroke by the reciprocating member, substantially as described.

4. In combination, a cross-head, guides therefor, the rollers between the cross-head and guides, a retainer having openings in which the rollers are held, said retainer being free from the cross-head to have a differential stroke in respect thereto and arranged to be adjusted at the ends of the strokes of said cross-head, substantially as described.

5. In combination, a cross-head, guides therefor, antifriction devices between the cross-head and the guides, and a retainer guided by the piston-rod and engaging the antifriction device, substantially as described.

6. In combination, a cross-head, two guides therefor, an antifriction device located between the cross-head and each guide, a retainer for the antifriction devices having a lateral bearing on the piston-rod and a longitudinal bearing on each antifriction device.

In testimony whereof I affix my signature in presence of two witnesses.

GEORGE LANE.

Witnesses:
C. J. BROWER,
J. M. JANES.